United States Patent [19]

Morrow

[11] Patent Number: 5,154,469
[45] Date of Patent: Oct. 13, 1992

[54] MOBILE, MULTIUSE, EXPANDABLE ROOMS

[76] Inventor: Floyd L. Morrow, 7132 Beldon St., San Diego, Calif. 92111

[21] Appl. No.: 721,283

[22] Filed: Jun. 26, 1991

[51] Int. Cl.⁵ .............................................. B60P 3/34
[52] U.S. Cl. ..................................... 296/26; 296/171; 296/175; 52/66; 52/67
[58] Field of Search ................. 296/26, 170, 171, 173, 296/175; 52/67, 66; 280/638, 656, 789

[56] References Cited

U.S. PATENT DOCUMENTS

| | | | |
|---|---|---|---|
| 1,436,984 | 11/1922 | Follett | 296/175 |
| 2,343,261 | 3/1944 | Marple | 296/26 |
| 2,842,972 | 7/1958 | Houdart | 296/26 X |
| 2,862,253 | 12/1958 | Place et al. | 296/171 X |
| 3,106,750 | 10/1963 | Jarman | 296/26 X |
| 3,312,362 | 4/1967 | Gilmore | 280/789 X |
| 3,330,574 | 7/1967 | Kulyk | 280/656 |
| 3,885,691 | 5/1975 | Knapp | 280/656 X |
| 4,049,310 | 9/1977 | Yoder | 296/26 |
| 4,358,133 | 11/1982 | Stucky | 296/26 X |

FOREIGN PATENT DOCUMENTS

| | | | |
|---|---|---|---|
| 174543 | 4/1953 | Fed. Rep. of Germany | 296/26 |
| 2941091 | 4/1981 | Fed. Rep. of Germany | 296/171 |
| 3144737 | 5/1983 | Fed. Rep. of Germany | 52/67 |
| 1033260 | 7/1953 | France | 296/171 |
| 712038 | 7/1966 | Italy | 52/67 |

Primary Examiner—Dennis H. Pedder

[57] ABSTRACT

A unit is described comprising a towable wheeled undercarriage upon which is mounted a unit having four independent rooms, each of which is collapsed for towing and which can be greatly extended in volume both horizontally and vertically for use. The four rooms have a common corner at the center of the unit. Each room includes a slide out section slidable beyond the sides of the undercarriage and an inner section that is attached to the floor. The slide out sections can be extended simultaneously until their roofs lock to a main roof over the fixed inner room sections. All roofs and their attached, telescoped, upper room walls can be raised simultaneously by a single drive device, such as a hydraulic cylinder, at the center of the main roof at the common corner of the rooms. With the rooms extended and the vertically extending rooms telescoped up, four large, private, independent, solid-walled, rooms with separate exterior doors are created. The undercarriage is mounted on four wheels on two axles. The forward axle is longer than the rear axle, so that the wheels can be nested together to provide improved stability and ease of towing.

11 Claims, 4 Drawing Sheets

MOBILE, MULTIUSE, EXPANDABLE ROOMS

BACKGROUND OF THE INVENTION

This invention relates to mobile, multiuse, expandable rooms that can be mounted on a variety of vehicles or fixed foundations. More specifically, the invention relates to a unit having a plurality of independent expandable rooms which is adapted to be mounted on a towable, wheeled frame.

Trailers having living accommodations have long been used by touring families or other groups, construction crews and the like. Basically, such trailers have a fixed shell towable by an automobile or truck. When used as living quarters, such trailers contain sleeping, cooking, shower and toilet facilities. The width of these trailers is constrained by highway vehicle width laws. When sufficient interior height is provided for convenience of the travelers, the exterior height is such as to produce considerable drag and wind resistance when towing, increasing fuel consumption. Also, a tall, long and narrow shell when affixed to a trailer undercarriage has considerable sail area, causing swaying and even overturning in high wind conditions. Since these trailers have largely open interiors, there is little privacy for the occupants.

A number of different trailer designs have been developed in attempts to overcome some of these problems, with varying success. Probably the most common way of adding space to a trailer is to provide slide out or tip out rooms, such as is described by Paul in U.S. Pat. No. 4,312,159. These rooms extend into the trailer body during travel and are extended out the side to provide added living space. While often useful, such extended rooms tend to make the existing space more useful, rather than adding significant additional space, can be used only with relatively large trailers and do not address the privacy question.

In order to reduce wind resistance and the impact of side winds during towing a number of vertically telescoping shells mounter on trailer undercarriages have been designed, such as that described by Watson in U.S. Pat. No. 2,990,214. While having a number of advantages during towing, these trailers still are narrow when in use and do not provide private quarters for the occupants.

So called "tent trailers" are very compact while towing, but are expandable by raising a roof and tilting out sleeping platforms. The space between the roof and the base and around the platforms is enclosed in tent material. While very compact, easily towed and generally storable in standard garages, these trailers are not comfortable for use in extreme temperature conditions. Very little interior space is provided and privacy is again a problem. Tent trailers also provide poor security, together with low strength and durability.

Very large "bunkhouse" trailers of the sort described by Barber et al in U.S. Pat. 4,652,041 have been developed for use by construction crews in remote locations or for similar purposes. Some of these have plural slide out rooms to add useful space while extended out but provide the required width for towing when stowed. These provide individual rooms for the occupants. However, these trailers are very large and heavy, requiring large vehicles for towing and the height of these trailers results in considerable wind resistance and sail area when towed.

While each of these prior expandable trailer arrangements have usefulness for specific purposes, none meets all of the problems of providing additional living space and privacy while meeting highway towing size limitations while providing low wind resistance and ease of towing in high winds. Thus, there is a continuing need for improvements in expandable trailers to overcome these problems.

SUMMARY OF THE INVENTION

It is, therefore, an object of this invention to provide a combination of plural, expandable rooms on a towable, wheeled frame that overcomes the above-noted problems. Another object is to provide such rooms that are expandable both in width and height from the collapsed towing position. A further object is to provide an expandable space on a living unit that gives increased security and privacy to the occupants. Yet another object is to provide a vehicle having reduced wind resistance and improved ease of towing. Still a further object is to provide expandable, mobile space having a simple and effective expansion system.

The above objects, and others, are accomplished by a system including plural expandable living spaces having width expanding slide out rooms, each of which has a lower section and a height-expanding telescoping upper section which includes wall and roof components. The slide out rooms consist of lower sections attached to an extendable mount and the upper sections containing the outer room roofs and attached upper room walls that telescope into and out of the lower sections. Inner sections of the rooms consist of lower sections that are fixed to the floor and upper sections that are attached to the central roof and which have walls that telescope into and out of the lower section. The central, main roof covers the entire fixed, inner area of all rooms and has attached the upper, telescoping sections of all fixed inner room sections.

To provide space for living quarters or other purposes all slide out sections of the rooms are extended simultaneously until their roofs lock to the central roof. The central roof along with all of the attached walls and roofs are then raised by a single erection means such as a screw jack or hydraulic piston at the center of the structure.

With the rooms in the collapsed, transportable, position, the four slide out room sections are ready to be deployed. Each room section includes plural floor beams, which are telescoped into tubes under the main section and a center beam that is independent of the room section. The center beam is manually pulled out. As the slide out room sections move outwardly they ride on the manually extended beam. The floor beams are preferably extended by a powered drive means to move the rooms to the extended position. The room sections can be deployed manually or by a powered system, such as jack screws or hydraulic cylinders, as desired. At least one support leg is provided at the extended end of each center beam to support the beam and slide out section.

Once the slide out room sections are deployed, all of the roof and upper wall modules are raised as a single unit. The roof raising means is preferably a hydraulic cylinder, although other extensible means, such as a jack screw, could be used if desired. Doors into each room and any supports under the ends of the frame or the ends of the slide out room sections are positioned. The unit is then ready for use. Typically, the unit may provide living and sleeping quarters for up to 16 persons with suitably arranged bunk beds. Each unit could also include a small bathroom and limited cooking facilities, e.g. a microwave oven. If desired, one room could be used for cooking, toilet and shower, or other facilities, with the other three used for living/sleeping. This multi-room arrangement could be used for any other suitable purpose, if desired. For example, the rooms could be used for offices on construction sites, for salesmen's offices at new home developments, as bunkhouses on construction sites or for survey crews, with separate "chuckwagon" units having some rooms set up for cooking, toilets and showers.

BRIEF DESCRIPTION OF THE DRAWING

Details of the invention, and of preferred embodiments thereof, will be further understood upon reference to the drawing, wherein.

DETAILED DESCRIPTION OF THE INVENTION

Figure 1:
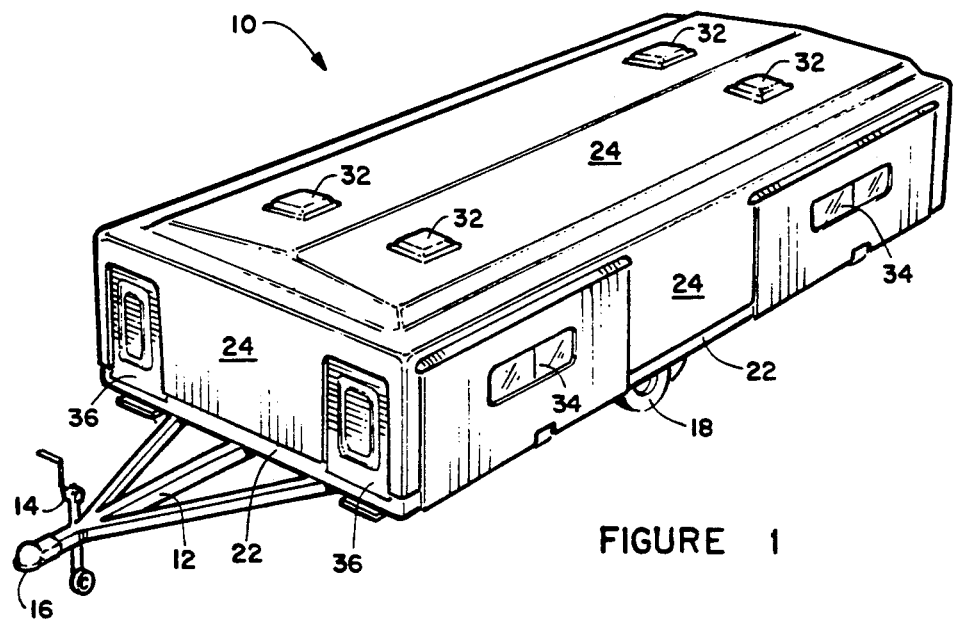
FIG. 1 is a perspective view of the unit with rooms in the collapsed configuration, ready for towing.

Referring now to FIG. 1, there is seen a unit 10 in the fully stowed position, ready for towing. While any suitable arrangement may be used for towing, the embodiment shown uses a conventional A-frame 12 with an extensible jack 14 to support the A-frame when not connected to a tow vehicle through ball receiver 16. The unit rides on wheels 18. Any suitable support system may be used to prevent tipping or rocking of the unit when set up, such as hydraulic extendable supports, jack stands, screw jacks or the like. Such supports may be provided in any convenient location, including near the outer ends of the slide out sections as described below or at the rear of the unit.

Basically, the outer shell of unit 10 includes a central housing 22 mounted on the undercarriage (as shown in detail in FIG. 6) with a central upper wall and roof module 24 telescoped down over housing 22. Four slide out sections 26 are telescoped into housing 22 from the sides. Each slide out section 26 includes an upper wall and roof module 28 telescoped down over the corresponding slide out section 26. This arrangement is very compact for ease of towing and meets all maximum width requirements for highway towing. The low vertical height decreases wind resistance during towing and will increase gas milage of the tow vehicle. Also, swaying and side winds will not be a major problem with the low height and low sail area.

Figure 2:
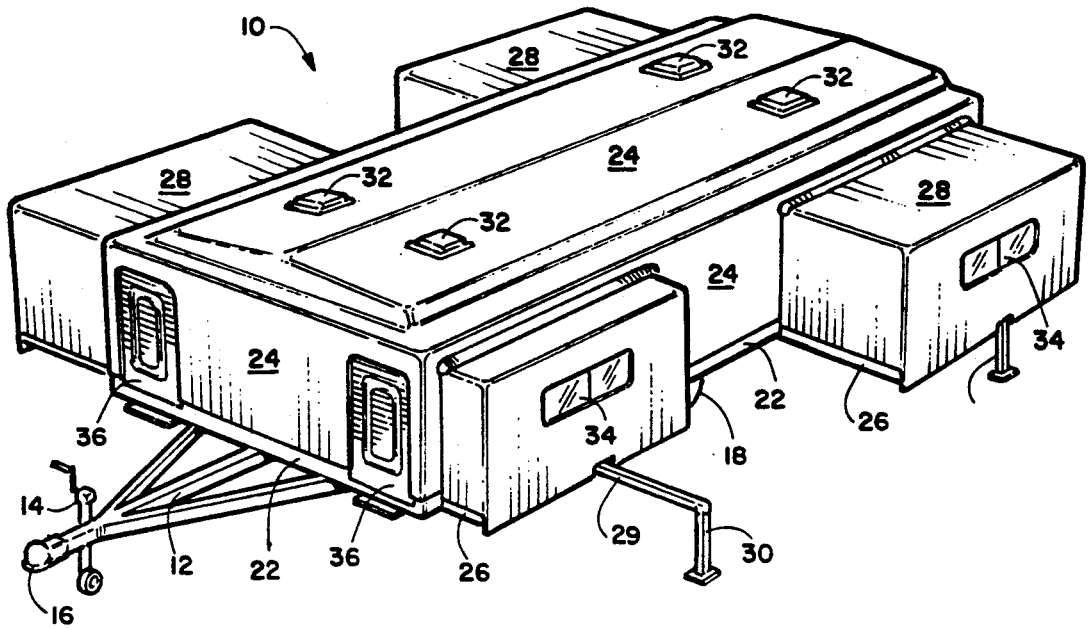
FIG. 2 is a perspective view of the trailer with the slide out sections extended.

The initial state of deployment of the unit is shown in FIG. 2. Three of the slide out sections 26 are moved to the extended position and one, in the foreground, is partially extended. Center beams 29 are each manually extended and support leg 30 put into position, then each section 26 is moved to the extended position by powered floor beams 27, as detailed below. The upper wall and roof modules 28 extend out with the slide out sections 26.

Slide out sections 26 may be deployed manually or with any suitable powered deployment mechanism. Each slide out section 26 is supported on a plurality of side floor beams 27 and a central beam 29 which telescope into tubes in the undercarriage (as seen in detail in FIG. 6) when the section is stowed. The manual and powered systems described in detail below are preferred for simplicity and effectiveness.

Figure 3:
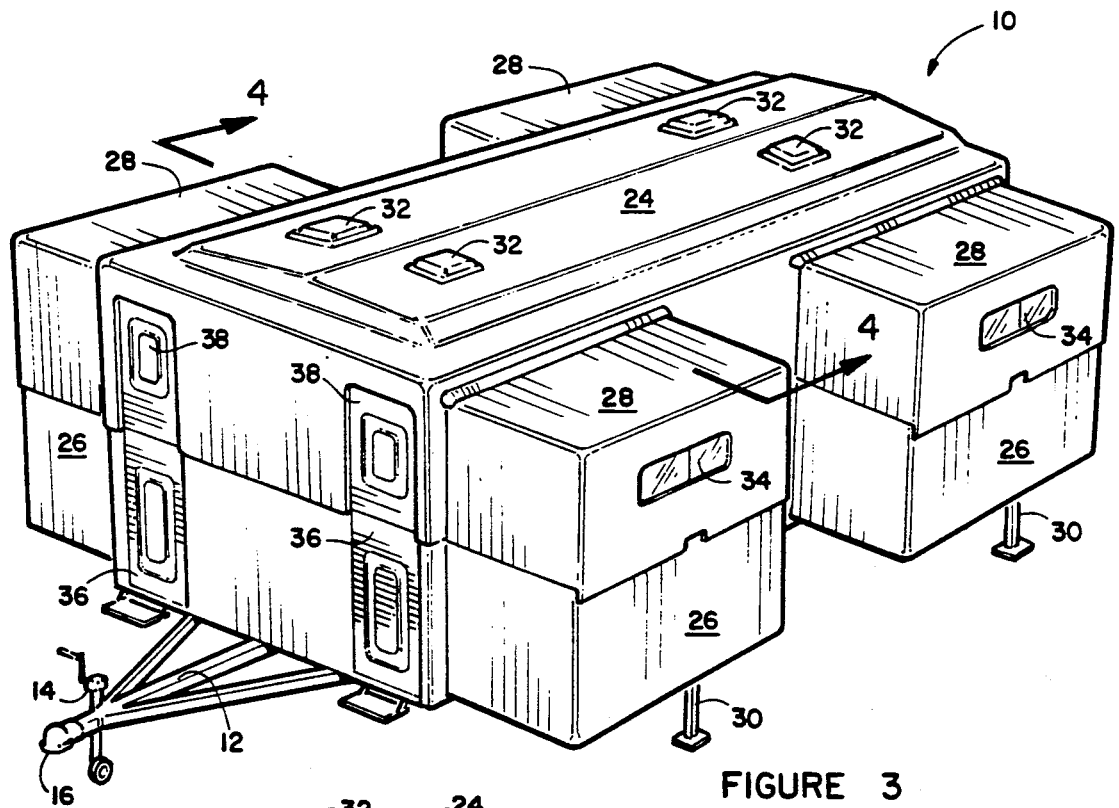
FIG. 3 is a perspective view of the unit fully deployed.

The final step in setting the unit up for use is raising the roof and upper side modules 28 to the position shown in FIG. 3. The upper side wall and roof module 28 over each slide out section 26 is secured to the central roof and upper wall module 24 by a mechanism detailed below, so that when an extensible means, such as a jack screw or hydraulic cylinder at the center of unit 10, at the common corner of the four rooms, is operated to raise the center of central roof module 24 the other modules 28 will also be raised.

Each room preferably has a ceiling vent 32, at least one window 34 and a door 36. The upper portion 38 of each door 36 is manually folded inward and down against the inside of the lower portion of door 36 when the unit is in the collapsed configuration. After deployment of unit 10 is complete, the upper door portion 38 is rotated to the upright position and locked with any conventional means, such as slide bolts.

Figure 4:
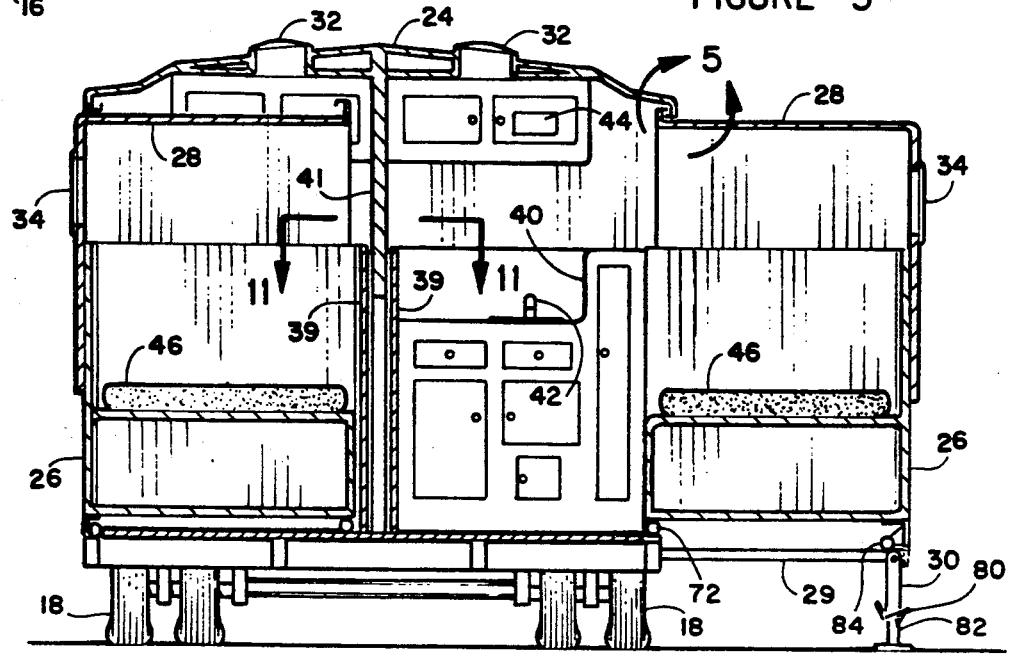
FIG. 4 is a schematic vertical section view, taken on line 4—4 in FIG. 3.

FIG. 4 provides a schematic vertical section through the deployed unit 10 as shown in FIG. 3. While generally slide out sections directly opposite each other will be deployed at the same time, if deployment is powered, FIG. 3 shows a deployed slide out section 26 on the right and a stowed section 26 on the left, for maximum clarity of illustration. The walls between adjacent rooms are preferably formed from a double, spaced, lower wall 39 secured to the central housing 22 and a movable telescoping upper wall 41, which moves vertically with central wall and roof module 24. In the embodiment shown, a cabinet 40 which may contain a sink 42 is provided along the central wall of the room. Slide out sections 26 when stored clear these cabinets, which are in the space between adjacent sections 26. An upper cabinet or microwave oven 44 may also be provided. A bed 46 is arranged in the slide out section. Two bunks, one on each side of section 26 or double bunks may be provided on one or both sides, as desired.

Figure 5:
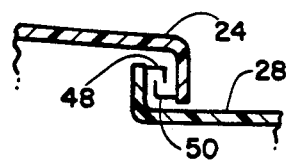
FIG. 5 is a detail view of the area indicated at 5 in FIG. 4.

Details of the mechanism locking the central upper wall and roof module 24 to the slide out section upper wall and roof module 28 are shown in detailed section in FIG. 5. The edge of module 24 carries an upwardly opening channel 50 and the edge of module 28 carries a downwardly opening channel 48. In the lowered position, the edge of channel 50 is below channel 48 so that module 28 can be slid from the stowed position to the deployed position shown in FIG. 5. When module 24 is lifted by the central extensible means, the channels 48 and 50 will interlock so that module 28 will be lifted with module 24.

Figure 6:
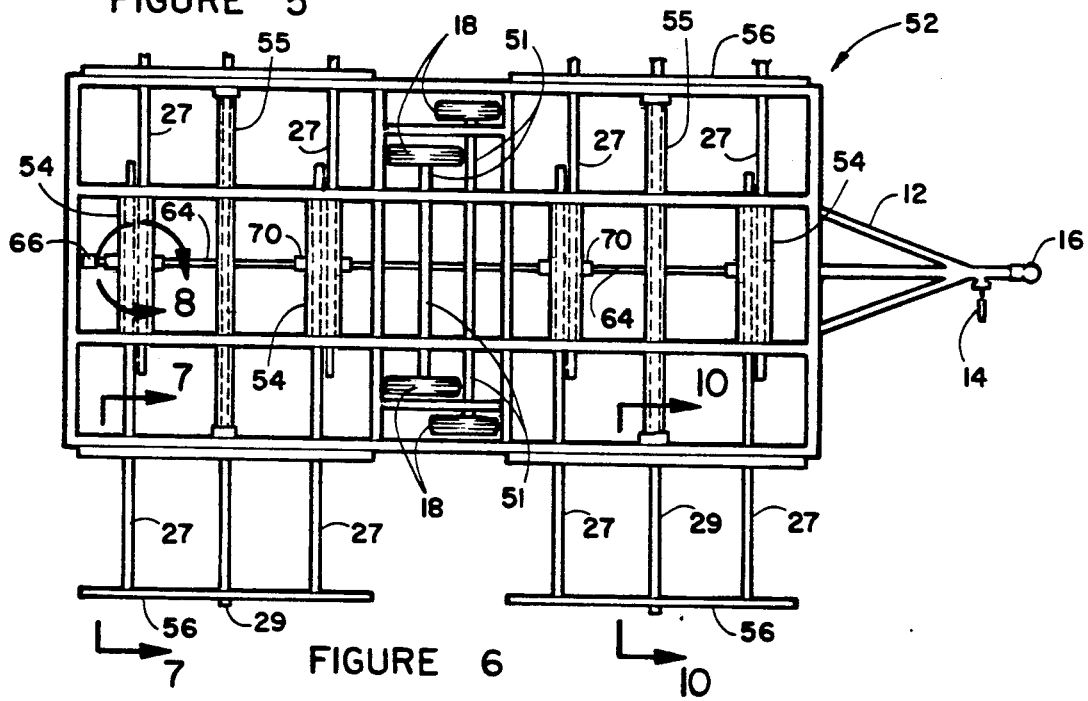
FIG. 6 is a schematic plan view of the unit undercarriage, with the unit housing and floor components removed.
Figure 12:
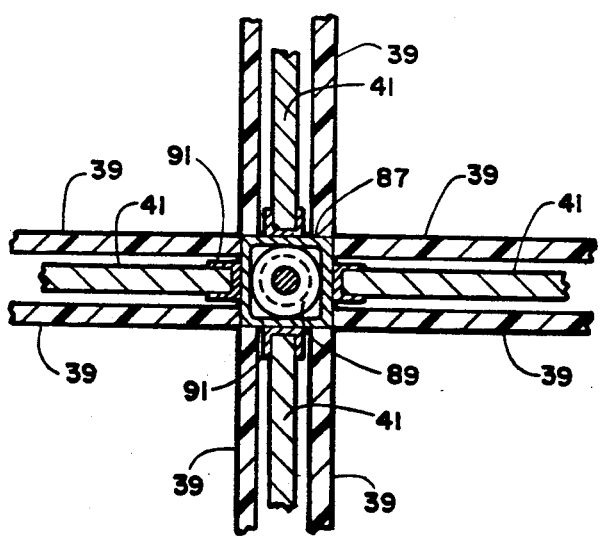
FIG. 12 is a view corresponding to that of FIG. 11, showing a second embodiment of the lifting mechanism.
Figure 11:
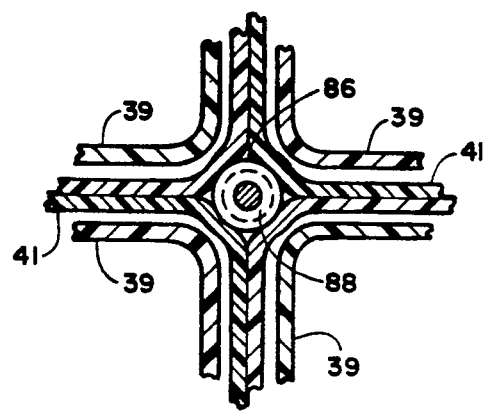
FIG. 11 is a schematic detail section view taken on line 11—11 in FIG. 4, showing the central lifting mechanism.

Details of the undercarriage are provided in FIG. 6, which is a plan view of the unit with the central housing 22 and the slide out sections 26, the upper wall and roof module 28 and the central roof elevating mechanism of FIGS. 11 and 12 removed. Ordinarily in the powered slide out section deployment embodiment shown sections on opposite sides will deploy simultaneously.

The unit undercarriage is mounted on wheels 18 through axles 51. While wheels could, if desired, be arranged in the usual tandem arrangement on axles of equal length, the staggered arrangement shown is preferred, since it enhances maneuverability and the wheels 18 can be placed very close to reduce the lengthwise area in which they extend up into frame 52 and the central housing space between adjacent slide out sections 26. This space between adjacent slide out sections 26 is used for cabinets 40 or the like as seen in FIG. 4 and is preferably quite narrow.

The basic unit frame 52 carries plurality of tubes 54 and 55 adapted to receive beams 27 and 29 respectively in a telescoping relationship. An endpiece 56 connects the ends of beams 27. Central beam 29 extends below endpiece, as indicated by the projecting ends of beam 29 If desired, central beam 29 could pass through an opening in an endpiece 56 having greater vertical thickness. For optimum stability, it is preferred that beams 27 and 29 and tubes 54 and 55 have square or rectangular cross sections.

Figure 7:
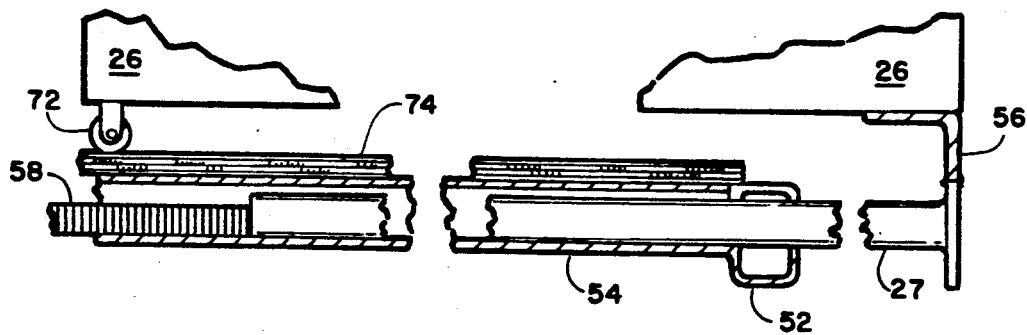
FIG. 7 is a schematic detail vertical section view taken substantially on line 7—7 in FIG. 6 showing the extensible slide out section support beams.
Figure 8:
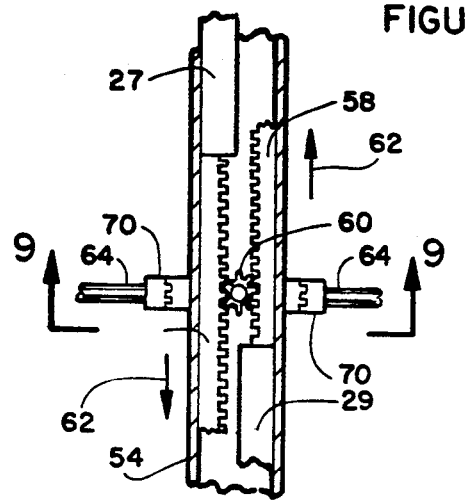
FIG. 8 is a partially cut away schematic detail view of the area indicated at 8 in FIG. 6.
Figure 9:
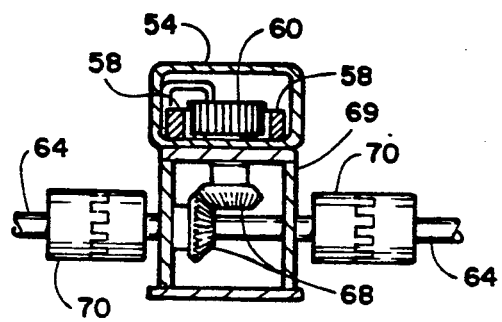
FIG. 9 is a schematic detail view taken on line 9—9 in FIG. 8.

Details of the drive mechanism for side beams 27 are illustrated in FIGS. 7-9. In the embodiment shown, the two side beams are elongated and slide within the side tubes 54. The opposite side beams 27 are powered by a central rack and pinon drive mechanism as detailed in FIGS. 7, 8 and 9. Each side beam 27 has an end portion shaped into a rack gear 58. A pinion gear 60 between the two racks 58 serves to drive the beams 27 simultaneously in opposite directions, either toward the stowed position or the deployed position as indicated by arrows 62. The pinion ears 60 may be driven by individual electric motors if desired.

In a preferred arrangement, all four side beams 27 can be driven simultaneously to rapidly and uniformly deploy all of the slide out section 26. A sectional drive shaft 64 extends from a motor 66 via gear boxes at motor 66 to pairs of bevel gears 68 in a housing 69 operatively connected to each pinon 60. Flexible couplings 70 compensate for any misalignment between drive shaft 64 and housing 69. As the slide out sections 26 are moved to the deployed position, a support caster 72 on the lower edge of slide out section 26 rides on room floor 74 to aid in a smooth transition.

Figure 10:
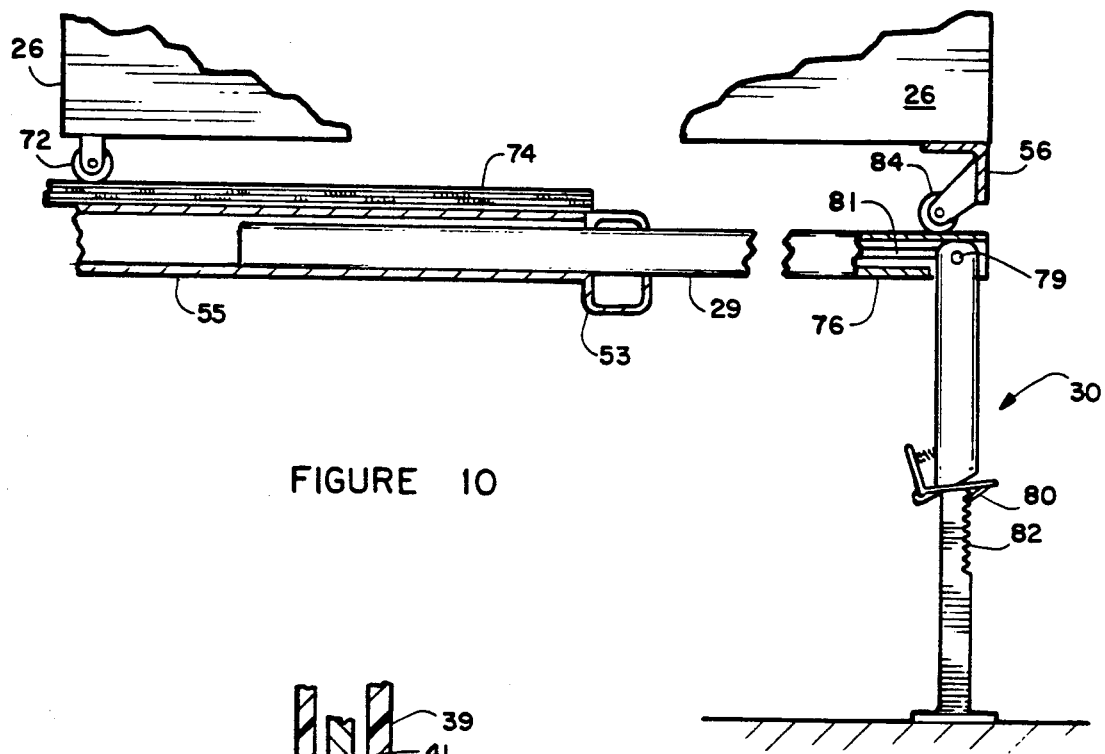
FIG. 10 is a schematic detail vertical section view taken substantially as in FIG. 7, showing the center the pull out section extension beam.

As described above, deployment is initiated by manually pulling central beam 29 out of tube the required distance and deploying leg 30, as shown in detail in FIG. 10. While any suitable support may be used, the swing down, adjustable length leg 30 is preferred for simplicity and reliability. Leg 30 is pivoted to a position with the edge of the leg abutting edge 76 of hollow beam 29. Inner leg 82 within leg 30 is extended downwardly into contact with the ground and finger 80 is brought into contact with detents 82 to lock the leg in place. Slide out section 26 is then moved toward the deployed position as described above, with a central caster 84 riding on beam 29 and slide out section 26 riding on caster 72 on floor 74. The leg 30 is stowed by releasing finger 80, telescoping the leg together, pivoting the leg to a horizontal position and inserting it into the hollow beam, with pivot pin 79 extending slightly to ride in interior grooves 81 in the inside wall of the beam.

If desired, any other support leg 30 may be used in place of that shown, both with the extending beam arrangements of FIG. 7-9 and of FIG. 10. Typical of these are foldable hydraulic cylinders, jack stands and the like.

FIG. 11 is a schematic section view through the central roof raising mechanism showing a first embodiment of the raising system. An approximately diamond shaped, vertical, housing 86 is positioned at the common corner of the four rooms and is secured to double bonded, double walls 41 which may typically be formed from a suitable plastic material. Hydraulic cylinder 88 is positioned in housing 86 and is connected to the underside of the roof (not seen in this FIG.). Upper walls 41 are secured to the roof and slide upwardly with the upper portion of hydraulic cylinder 88 when the central upper wall and roof module 24 is raised. A conventional hydraulic pump (not shown) may be used to drive cylinder 88.

As second embodiment of the roof raising mechanism is shown in detail section view in FIG. 12. Here a conventional jackscrew 89 is located within a square housing 87 and is in operative contact with the underside of the roof (not seen in this FIG.). Upper walls 41 are secured to the roof and move upwardly in channels 91 with the roof. Housing 87 and double lower walls 39 are secured to the lower section of the unit.

Although the preferred embodiment shown has rooms mounted on a trailer undercarriage, similar problems of size, wind resistance, sail area, strength and privacy are found whenever sizable structures for living quarters are moved rapidly. The basic unit described here is also suitable for mounting as an integral part of a motor vehicle, on a railroad car or boat hull. The basic unit may also be removed from the undercarriage and placed on a fixed foundation.

Thus, it is apparent that the unit of this system utilizes a simple, sturdy and efficient expansion system which may be easily shifted between an easily towed stowed position and a comfortable four room deployed position.

Other applications, variations and ramifications of this invention will occur to those skilled in the art upon reading this disclosure. Those are intended to be included within the scope of this invention, as defined in the appended claims.

I CLAIM:
1. A unit having a plurality of expandable rooms which comprises;
 a movable transportation means;
 a central housing mounted on said movable transportation means and having upwardly extending lower walls and a central upper wall and roof module telescoped downwardly relative to said central housing;
 a plurality of slide out sections telescoped into two opposite sides of said central housing;
 means for moving each of said slide out sections between a stowed position telescoped into said central housing and a deployed position extending outwardly of said housing;

each of said slide out sections including an upper wall and roof module telescoped downwardly relative to said slide out section;

said slide out modules having means to interlock to said central upper wall and roof module when said slide out sections are fully deployed;

a single centrally located extensible means connected to said central housing module adapted to raise the central upper wall and roof module and all slide out section upper wall and roof modules as a single unit; and means including each slide out section and portions of said central housing for forming a plurality of single private rooms.

2. The unit according to claim 1 wherein each of said moving means for each of said slide out sections includes a plurality of side beams and at least one manually movable central beam telescoped into tubes secured to said movable transportation means, said central beams being manually extendable to support said slide out sections during deployment of said slide out sections.

3. The unit according to claim 2 wherein said means for moving include power drive means for moving said side beams and associated module as a unit between deployed and stowed positions.

4. The unit according to claim 3 wherein a single set of said tubes receive said side beams from each pair of slide out sections on opposite sides of said movable transportation means and said moving means further comprises overlapping rack gears secured to the inner ends of said side beams within said tubes, a single pinion gear engaging said rack gears and said power drive means includes means for rotating said pinion gear to drive said racks and said side beams between the deployed and stowed positions.

5. The unit according to claim 2 wherein;

each of said central beam includes, at the outward end, support means for extending between the beam and the ground to support the extended end of said one beam; and each of said slideout sections includes support wheel means riding on said central beam during movement between stowed and deployed positions.

6. The unit according to claim 5 further including additional caster means between said slide out section and the floor of side central housing to aid in smooth movement of side slide out section between the stowed and deployed position.

7. The unit according to claim 5 wherein said support means comprises:

a tubular outer end portion in said one manually movable central beam;

a leg movably secured to said outer end of said beam;

means permitting said leg to be moved from a stowed position within said outer beam end portion to a deployed position extending from said end portion and pivoted toward the ground;

means for varying the length of said leg; and means for locking said leg at a selected length.

8. The unit according to claim 1 wherein said central housing lower walls extend between all slide out sections and comprise closely spaced pairs of walls between which said downwardly extending upper walls telescope.

9. The unit according to claim 1 wherein said extensible means is selected from the group consisting of hydraulic cylinders and powered jackscrews.

10. The unit according to claim 1 wherein said movable transportation means comprises a trailer undercarriage mounted on a plurality of wheels, said wheels include two pairs of wheels on parallel axles, the distance between wheels on one axle being less than the distance between wheels on the other axle, and said axles being closely spaced with said wheels overlapping.

11. The unit according to claim 1 wherein said movable transportation means comprises a trailer undercarriage mounted on a plurality of wheels, said wheels being mounted on axles of different length and wheels on the shorter axle being positioned closely adjacent to the longer axle.

* * * * *